L. SANDER.
FISHING NET FLOAT.
No. 179,490. Patented July 4, 1876.
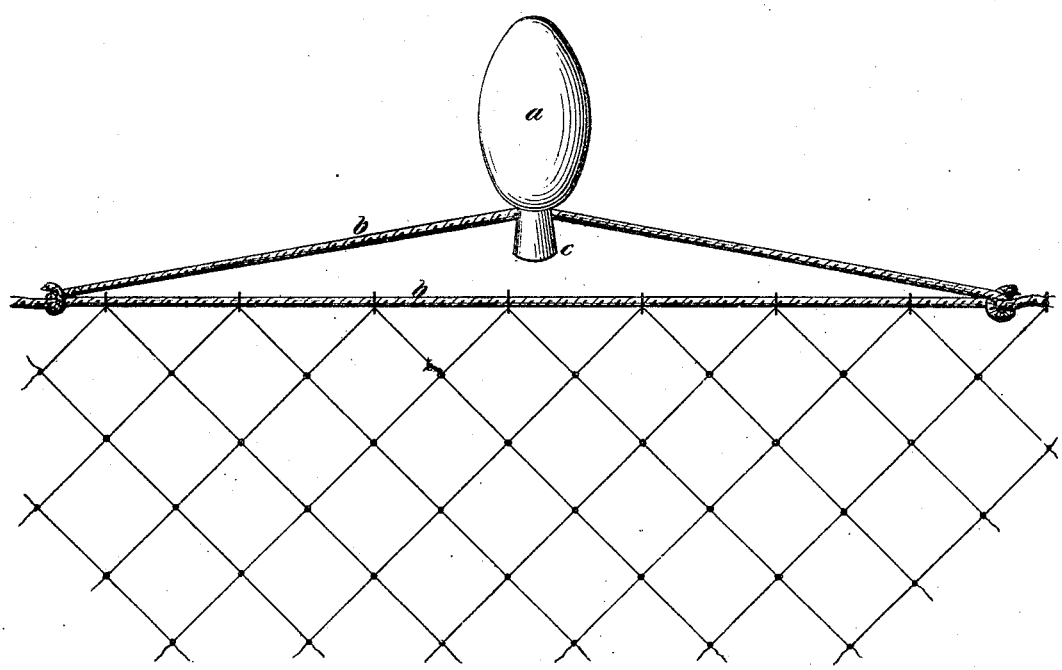
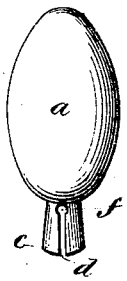
Witnesses.
Sylvester A Wood
F. H. Harris
Inventor.
Ludewig Sander

UNITED STATES PATENT OFFICE.

LUDEWIG SANDER, OF MANITOWOC, WISCONSIN.

IMPROVEMENT IN FISHING-NET FLOATS.

Specification forming part of Letters Patent No. 179,490, dated July 4, 1876; application filed April 15, 1876.

*To all whom it may concern:*

Be it known that I, LUDEWIG SANDER, of the city of Manitowoc, in the county of Manitowoc and State of Wisconsin, have invented a new and useful Improvement in Floats to be Attached to Fishing-Nets, which improvement is fully set forth in the following specification, reference being had to the accompanying drawings.

The object of my invention is the construction and use of floats, made of light wood or other suitable buoyant substances, for sustaining fishing-nets in an upright position in water, as shown in Figure 1, representing a section of a net with a float, $a$, attached, which floats are so constructed as to admit of being instantly attached to or detached from the net without strings, and the tying and untying of knots, as is usual in such cases.

The floats may be gourd-shaped, as shown in the drawings, or of any other desired form, but should be large enough not to pass through the meshes of the net, and will be more efficient if formed with a neck, $c$, as shown in the drawings.

The principal merit of the float consists in the neck with the thin vertical slot $d$, opening longitudinally into a hole, $f$, of larger diameter, bored through it close to the body of the float, as shown in Fig. 2, which slot and hole permit the divided parts of the neck to spring sufficiently to pass the meters $b$ of the net between them into the hole J, when the slot partially closes and holds the float in position, which arrangement admits of the instantaneous attaching and detaching of the floats without strings, and the tying and untying of knots, as above stated.

I claim as my invention—

1. A float for fishing-nets, constructed of wood or other suitable material, and provided with the attaching-slot $d\,f$, for securing the same to the net, substantially as described.

2. A fishing-net float, provided with the tapered neck $c$, having slot $d\,f$, substantially as and for the purpose described.

LUDEWIG SANDER.

Witnesses:
SYLVESTER A. WOOD,
F. H. HARRIS,
EMIL BARNSCH.